UNITED STATES PATENT OFFICE.

JACOB GROSSMANN, OF MANCHESTER, ENGLAND.

METHOD FOR THE UTILIZATION OF NITER CAKE.

1,298,334.   Specification of Letters Patent.   Patented Mar. 25, 1919.

No Drawing.   Application filed September 2, 1916.   Serial No. 118,209.

*To all whom it may concern:*

Be it known that I, JACOB GROSSMANN, a subject of the King of Great Britain and Ireland, and a resident of Manchester, in the county of Lancaster, England, have invented a certain new and useful Improved Method for the Utilization of Niter Cake, of which the following is a specification.

Niter cake is a product of variable composition; theoretically it is a mixture of sodium sulfate and sodium hydrogen sulfate but for general purposes it is generally looked upon as a mixture of sodium sulfate and free sulfuric acid. Thus, for example, a niter cake showing by test about 30% of free sulfuric acid could be expressed by the formula, $5Na_2SO_4 + 3H_2SO_4$, which corresponds to 70.7% $Na_2SO_4$ and 29.3% $H_2SO_4$. A niter cake containing about 20% of free acid might be expressed by the formula, $3Na_2SO_4 + H_2SO_4$, which would correspond to 81.3% of $Na_2SO_4$ and 18.7% $H_2SO_4$. In the following description of my method of dealing with niter cake, which aims at the practical and commercial utilization of both the sodium sulfate and the free sulfuric acid contained in it by obtaining sodium sulfate and caustic soda, I have, for the purpose of explanation, assumed that we are dealing with a niter cake which somewhere corresponds to the formula, $3Na_2SO_4 + H_2SO_4$, but the reactions will of course equally hold good to niter cake containing more or less than 20% of free sulfuric acid.

In the first place I commence with a certain amount of calcium sulfite which I will term the original stock. This is mixed with a sufficient quantity of water or suitable weak washings from other operations incidental to the process, to which is added slowly and gradually, and with agitation in a suitable mixing apparatus, a solution of niter cake in water or in suitable wash liquors obtained from other operations incidental to the process, or I may reverse the addition of the ingredients, the relative quantities used being such as to attain the object of this operation, that is to produce the reaction according to the following equation:—

*Equation 1.*

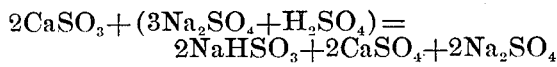

The apparatus used for this purpose consists of a tank made of lead or other acid resisting material and provided with an agitating contrivance, and the tank may be preferably covered so as to allow the operation to be carried out either at ordinary or augmented pressure.

When the reaction is completed, which may be ascertained by tests such as are well known to chemists, the solution is separated from the insoluble calcium sulfate by decantation, filtration, centrifuging or other means. It is now placed into another tank provided with agitating apparatus and slaked lime is added to it gradually, with agitation, so as to produce the effect shown in the subjoined Equations 2 and 3, or the solution may be added to the lime. The following reactions take place:—

*Equation 2.*

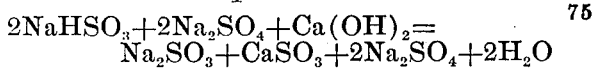

*Equation 3.*

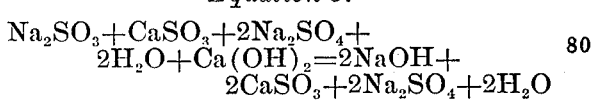

It will be seen that with proper agitation the end products yielded by the action of lime on the solution produced as per Equation 1 are thus a solution of caustic soda and sodium sulfate and a precipitate of calcium sulfite theoretically equal to the original quantity of stock. In the cycle of operations it will therefore only be necessary to use such further quantities of calcium sulfite beyond the original stock as will be required to compensate for the mechanical and chemical losses of this compound which in the practical working of the process are unavoidable.

The apparatus used for carrying on the reactions as per Equations 2 and 3 is similar in construction to that used for mixing niter cake with calcium sulfite, and is preferably covered so as to allow the operations to be carried out either at ordinary or augmented pressure. It also contains an arrangement for heating the mixture which, particularly toward the end of the causticizing operation, may be desirable. When the reaction is finished and the causticizing has progressed as far as it will go, the liquid part is separated from the solid calcium sulfite by any of the well known means of settling and decantation, filtration, centrifuging or other means, and the liquor contained in the main sodium sulfate and caustic soda is evaporated in suitable vessels at ordinary, diminished or augmented pressure, and the sodium sulfate which separates out in a purified state and practically free from iron compounds is removed by "fishing" or other suitable means until a point is reached at which the caustic soda solution may be used as such or made into solid caustic soda by any of the known means used at present in the manufacture of caustic soda.

The calcium sulfite which has been separated from the liquors is washed, and the weak wash liquors are used up again in the manner well known to chemists either for mixing with slaked lime or in other ways. After washing, the calcium sulfite is ready to be used again in the first operation as per Equation 1 after being mixed with such a quantity of fresh calcium sulfite as may be necessary to make up for what has been lost in the process. If an excess of lime has been used in the causticizing process, sufficient sulfurous acid or calcium hydrogen sulfite should be added in order to neutralize the alkalinity of the recovered calcium sulfite, or the recovered calcium sulfite may be subjected to the fumes of sulfurous acid to effect that purpose.

The reactions shown in Equations 2 and 3 may be performed in separate operations or carried out in one operation. If carried out in separate operations, the solid matter produced by the reaction of Equation 2 is removed by filtration or otherwise before further lime is added. If carried out in one operation, the total quantity of lime necessary to produce caustic soda is added so as to produce the final result as shown in Equation 3 and the insoluble matter is then removed by filtration or otherwise. The reactions shown in Equations 1 and 2 may be carried out in one operation, so that sodium sulfite is produced in solution which after filtration may be treated as per Equation 3. The reactions shown in Equations 1, 2 and 3 may be carried out in one operation if desired, that is without separating the calcium sulfate from the soluble compounds produced by Equation 1 before mixing with lime, though the resulting mixture of calcium sulfate and calcium sulfite has to be separated from the liquor before the latter is evaporated. The reactions shown in Equations 1, 2 and 3 may be carried out under ordinary, diminished or augmented pressure and at such temperatures as will yield the best results in the production of sodium hydrogen sulfite and ultimately caustic soda, and which will depend in each case on the construction of the plant and ascertained in practical work.

As niter cake varies very considerably in composition and may contain from less than 20% to more than 30% of free acid, the concentrations to be used in the reactions explained above in order to give the highest yield in sodium hydrogen sulfite and ultimately in caustic soda are best ascertained by experiment in each specific case in manner well known to chemists.

What I claim as my invention and desire to secure by Letters Patent is:—

1. The process of producing caustic soda and sodium sulfate which consists in mixing calcium sulfite with niter cake in solution whereby soluble compounds and a precipitate are formed, and adding calcium hydroxid to the soluble compounds.

2. The process of producing caustic soda and sodium sulfate which consists in agitating calcium sulfite with niter cake in solution whereby soluble compounds and a precipitate are formed, separating the soluble compounds from the precipitate and agitating said soluble compounds with a calcium hydroxid.

3. A process for the production of caustic soda and sodium sulfate which comprises mixing niter cake in solution with calcium sulfite whereby calcium hydrogen sulfite and subsequently sodium hydrogen sulfite is produced, removing the calcium sulfate produced by the double decomposition between part of the sodium sulfate contained in the niter cake and the calcium hydrogen sulfite from the solution filtration, mixing the solution thus obtained with a quantity only of lime as will produce sodium sulfite, removing the calcium sulfite thus obtained from the liquid by filtration, adding a further quantity of lime to the sodium sulfite solution thus obtained to produce caustic soda, removing the calcium sulfite obtained in this operation by filtration, boiling down the separated solution and recovering the remainder of the sodium sulfate originally contained in the niter cake from it by fishing and ultimately obtaining the caustic soda the solution freed as far as possible from sodium sulfate; and treating the calcium sulfite obtained in the above operations with free sulfurous acid and using the thus treated calcium sulfite in subsequent repetitions of the process.

In witness whereof I have hereunto set my hand in the presence of two subscribing witnesses.

JACOB GROSSMANN.

Witnesses:
 EDMUND WARD PATTISON,
 HAROLD WALKER.